(12) United States Patent
Oka et al.

(10) Patent No.: US 10,734,926 B2
(45) Date of Patent: Aug. 4, 2020

(54) MULTI-AXIS MOTOR CONTROL SYSTEM, MOTOR CONTROL APPARATUS, AND MOTOR CONTROL METHOD

(71) Applicant: Kabushiki Kaisha Yaskawa Denki, Kitakyushu (JP)

(72) Inventors: Yusuke Oka, Kitakyushu (JP); Hiroki Inoue, Kitakyushu (JP); Tadashi Okubo, Kitakyushu (JP)

(73) Assignee: Kabushiki Kaisha Yaskawa Denki, Kitakyushu-shi (JP)

( * ) Notice: Subject to any disclaimer, the term of this patent is extended or adjusted under 35 U.S.C. 154(b) by 16 days.

(21) Appl. No.: 15/686,631

(22) Filed: Aug. 25, 2017

(65) Prior Publication Data

US 2018/0109207 A1    Apr. 19, 2018

(30) Foreign Application Priority Data

Oct. 18, 2016   (JP) .................................. 2016-204149
Jan. 10, 2017   (JP) .................................. 2017-001885

(51) Int. Cl.
| | |
|---|---|
| *H02P 5/00* | (2016.01) |
| *H02P 5/68* | (2006.01) |
| *H02P 5/74* | (2006.01) |
| *B30B 1/18* | (2006.01) |
| *B30B 15/00* | (2006.01) |
| *B30B 15/14* | (2006.01) |

(52) U.S. Cl.
CPC ............... *H02P 5/00* (2013.01); *B30B 1/186* (2013.01); *B30B 15/0094* (2013.01); *B30B 15/148* (2013.01); *H02P 5/68* (2013.01); *H02P 5/74* (2013.01); *B30B 1/18* (2013.01)

(58) Field of Classification Search
CPC ..... B30B 1/18; B30B 15/148; B30B 15/0094; H02P 5/00
USPC ............................................................. 318/8
See application file for complete search history.

(56) References Cited

U.S. PATENT DOCUMENTS

| | | | |
|---|---|---|---|
| 4,124,889 A * | 11/1978 | Kaufman ................ | G06F 11/10 700/3 |
| 10,040,193 B2 * | 8/2018 | Kobayashi ........... | G05B 19/041 |
| 2003/0121642 A1 * | 7/2003 | Thompson ................ | H04L 1/22 165/80.2 |
| 2008/0084171 A1 * | 4/2008 | Leehey ................ | G05B 19/042 318/34 |
| 2009/0102409 A1 * | 4/2009 | Okita ................... | G05B 19/404 318/561 |

(Continued)

FOREIGN PATENT DOCUMENTS

JP    2007-241744 A    9/2007

*Primary Examiner* — Jorge L Carrasquillo
*Assistant Examiner* — Devon A Joseph
(74) *Attorney, Agent, or Firm* — Oblon, McClelland, Maier & Neustadt, L.L.P.

(57) ABSTRACT

A multi-axis motor control system includes a host control apparatus, motors, motor control apparatuses that drives the motors and each includes circuitry that acquires control related information transmitted and received between the host control apparatus and at least one other motor control apparatus, and controls a corresponding motor of the motors based on the control related information, and a communication channel that connects the host control apparatus and the motor control apparatuses in series.

18 Claims, 9 Drawing Sheets

(56) References Cited

U.S. PATENT DOCUMENTS

| | | | |
|---|---|---|---|
| 2009/0234538 A1* | 9/2009 | Ta | B62D 5/046 |
| | | | 701/41 |
| 2012/0159916 A1* | 6/2012 | Ishii | B60L 58/40 |
| | | | 56/10.2 A |
| 2012/0187885 A1* | 7/2012 | Hama | H02P 8/40 |
| | | | 318/490 |
| 2014/0084839 A1* | 3/2014 | Matsumura | H02P 5/46 |
| | | | 318/570 |
| 2014/0097859 A1* | 4/2014 | Matsumura | G01R 31/67 |
| | | | 324/750.01 |
| 2014/0306452 A1* | 10/2014 | White | B64C 25/405 |
| | | | 290/45 |
| 2017/0220035 A1* | 8/2017 | Naoi | G05B 23/0286 |
| 2017/0237385 A1* | 8/2017 | Kabitzke | H02P 27/04 |
| | | | 318/558 |
| 2017/0264220 A1* | 9/2017 | Rattan | H02P 23/0077 |
| 2018/0048250 A1* | 2/2018 | Zhao | H02P 5/74 |

* cited by examiner

MULTI-AXIS MOTOR CONTROL SYSTEM, MOTOR CONTROL APPARATUS, AND MOTOR CONTROL METHOD

CROSS-REFERENCE TO RELATED APPLICATION

The present application is based upon and claims the benefit of priority to Japanese Patent Applications No. 2016-204149, filed Oct. 18, 2016 and No. 2017-001885, filed Jan. 10, 2017. The entire contents of these applications are incorporated herein by reference.

BACKGROUND OF THE INVENTION

Technical Field

The disclosed embodiment relates to a multi-axis motor control system, a motor control apparatus, and a motor control method.

Description of Background Art

A motion controller outputs instructions commonly reflecting each state of a plurality of servo drivers to each servo driver.

SUMMARY OF THE INVENTION

According to one aspect of the present invention, a multi-axis motor control system includes a host control apparatus, motors, motor control apparatuses that drives the motors and each includes circuitry that acquires control related information transmitted and received between the host control apparatus and at least one other motor control apparatus, and controls a corresponding motor of the motors based on the control related information, and a communication channel that connects the host control apparatus and the motor control apparatuses in series.

According to another aspect of the present invention, a motor control apparatus connected to a host control apparatus and at least one other motor control apparatus in series via a communication channel includes circuitry that acquires control related information transmitted and received between the host control apparatus and the at least one other motor control apparatus, and controls a corresponding motor based on the control related information.

According to yet another aspect of the present invention, a motor control method executed by an arithmetic processing circuit of a motor control apparatus connected to a host control apparatus and at least one other motor control apparatus in series via a communication channel includes acquiring control related information transmitted and received between the host control apparatus and the at least one other motor control apparatus, and controlling a corresponding motor based on the control related information.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF THE EMBODIMENTS

Embodiments will be described with reference to the drawings.

Schematic Configuration of Multi-Axis Motor Control System

Figure 1:
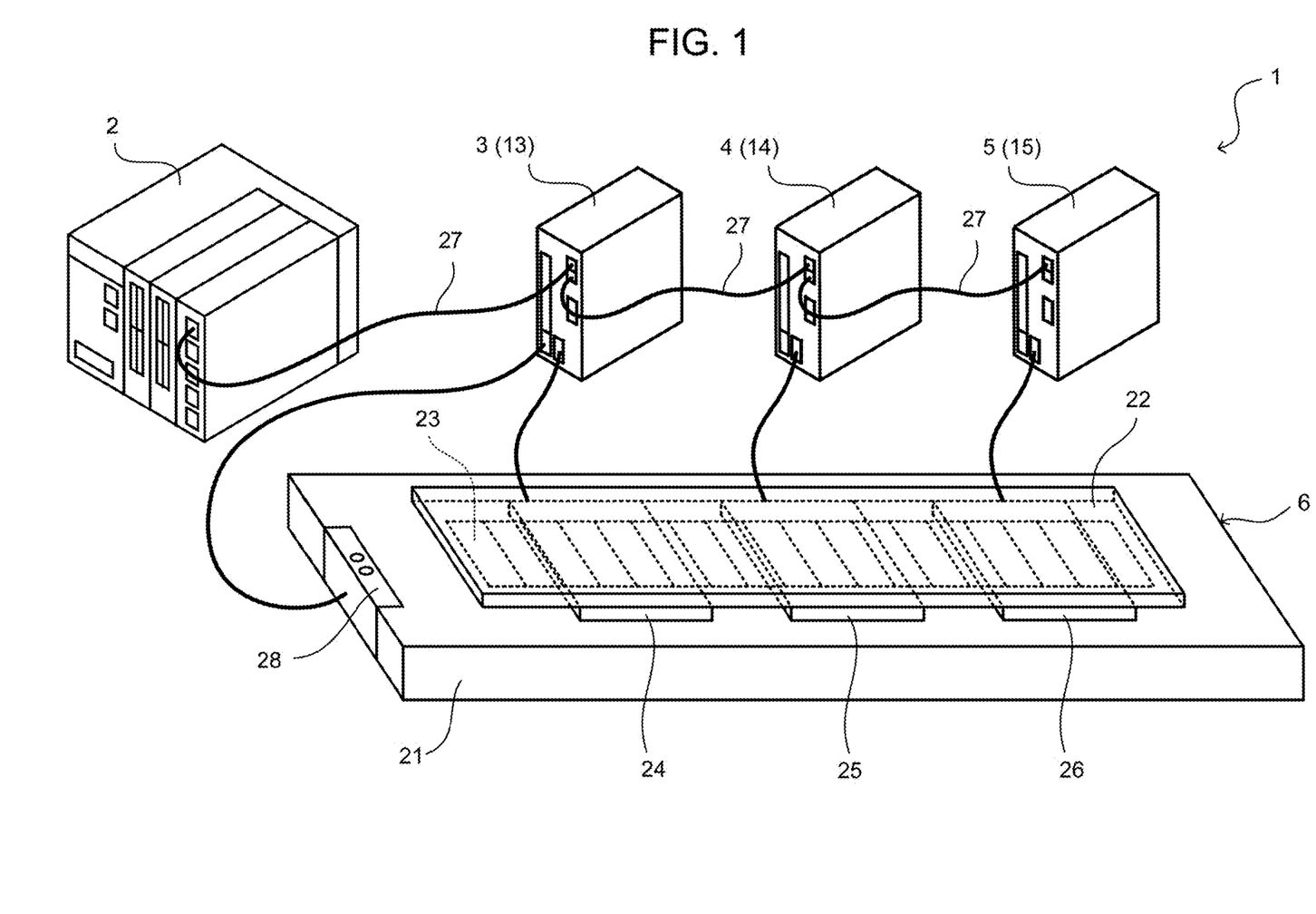
FIG. 1 is a diagram showing an exemplary schematic system configuration of a multi-axis motor control system related to an embodiment.

FIG. 1 shows an exemplary schematic system configuration of a multi-axis motor control system of the present embodiment. A multi-axis motor control system 1 shown in FIG. 1 drives a single mover table 22, for example, by controlling three linear motors in coordination. The multi-axis motor control system 1 includes one host controller 2, for example, three servo amplifiers 3, 4, and 5 connected to the host controller 2 so as to enable signal transmission and reception, and one linear slider 6 whose driving is controlled by the three servo amplifiers 3, 4, and 5.

The host controller 2 (an embodiment of a host control apparatus) is constituted by, for example, a PLC (Programmable Logic Controller) and manages various kinds of information in the entire multi-axis motor control system 1 to control the overall operation of the system.

The servo amplifiers 3, 4, and 5 (embodiments of motor control apparatuses) control power supply to armatures 24, 25, and 26 (described below) disposed on the linear slider 6, respectively, based on control signals input from the host controller 2.

The linear slider 6 (an embodiment of a driving machine) linearly drives the single mover table 22 to a single stator 21. In the example shown in FIG. 1, a plurality of permanent magnets 23 is arranged in series on the stator 21 side, and, for example, the three armatures 24, 25, and 26 are fixed on the linearly movable mover table 22 along the arrangement direction. The common array of the permanent magnets 23 and the respective armatures 24, 25, and 26 are combined to constitute the linear motor that is one linear motion type motor. That is, the linear slider 6 linearly drives the one mover table 22 with the three linear motors. Other than this configuration, a configuration may be adopted in which the armatures 24, 25, and 26 are disposed on the stator 21 side, and the array of the permanent magnets 23 are disposed on the mover table 22 side.

The armatures 24, 25, and 26 are individually connected to the corresponding servo amplifiers 3, 4, and 5, respectively. The respective servo amplifiers 3, 4, and 5 supply power to the corresponding armatures 24, 25, and 26, which then generate alternating magnetic fields, respectively. The alternating magnetic fields generate attraction and repulsive forces for the array of the permanent magnets 23 on the stator 21 side, thereby applying linear motion thrust forces in a predetermined direction to the mover table 22. Then, power supply control is performed in coordination by the respective servo amplifiers 3, 4, and 5, and thus the single mover table 22 is linearly driven smoothly.

In order to perform such coordinated control, all the servo amplifiers 3, 4, and 5 and the host controller 2 are mutually connected via cables 27 that are communication channels so that various kinds of communication information can be mutually transmitted and received. In the present embodiment, the host controller 2 is positioned at the end, and the other three servo amplifiers 3, 4, and 5 are connected in series. Hereinbelow, the connection form of the communication network connected in series via the communication channels is referred to as "daisy chain connection".

Among the three servo amplifiers 3, 4, and 5, particularly, the servo amplifier 3 directly connected to the host controller 2 is set as a master servo 13 (an embodiment of a master motor control apparatus) corresponding to a drive shaft. The other servo amplifier 4 directly connected to the master servo 13 is set as a first slave servo 14 (slave motor control apparatus) corresponding to a first driven shaft. The other servo amplifier 5 directly connected to the first slave servo 14 is set as a second slave servo 15 (slave motor control apparatus) corresponding to a second driven shaft. Although not specifically shown, additionally other interfaces and control apparatuses may be connected to the lower-level side of the second slave servo 15 (the opposite side of the host controller 2).

Moreover, a mechanical sensor 28 constituted by, for example, a photo sensor is disposed at one end of the stator 21 side on the linear slider 6 shown in FIG. 1. When the mover table 22 moves linearly so that its end covers the upper part of the mechanical sensor 28, the mechanical sensor 28 outputs to the master servo 13 detection information, which indicates that the mover table 22 has operated beyond a limit range, as an OT signal (Over Travel signal).

Hardware Block Configuration of Multi-Axis Motor Control System

Figure 2:
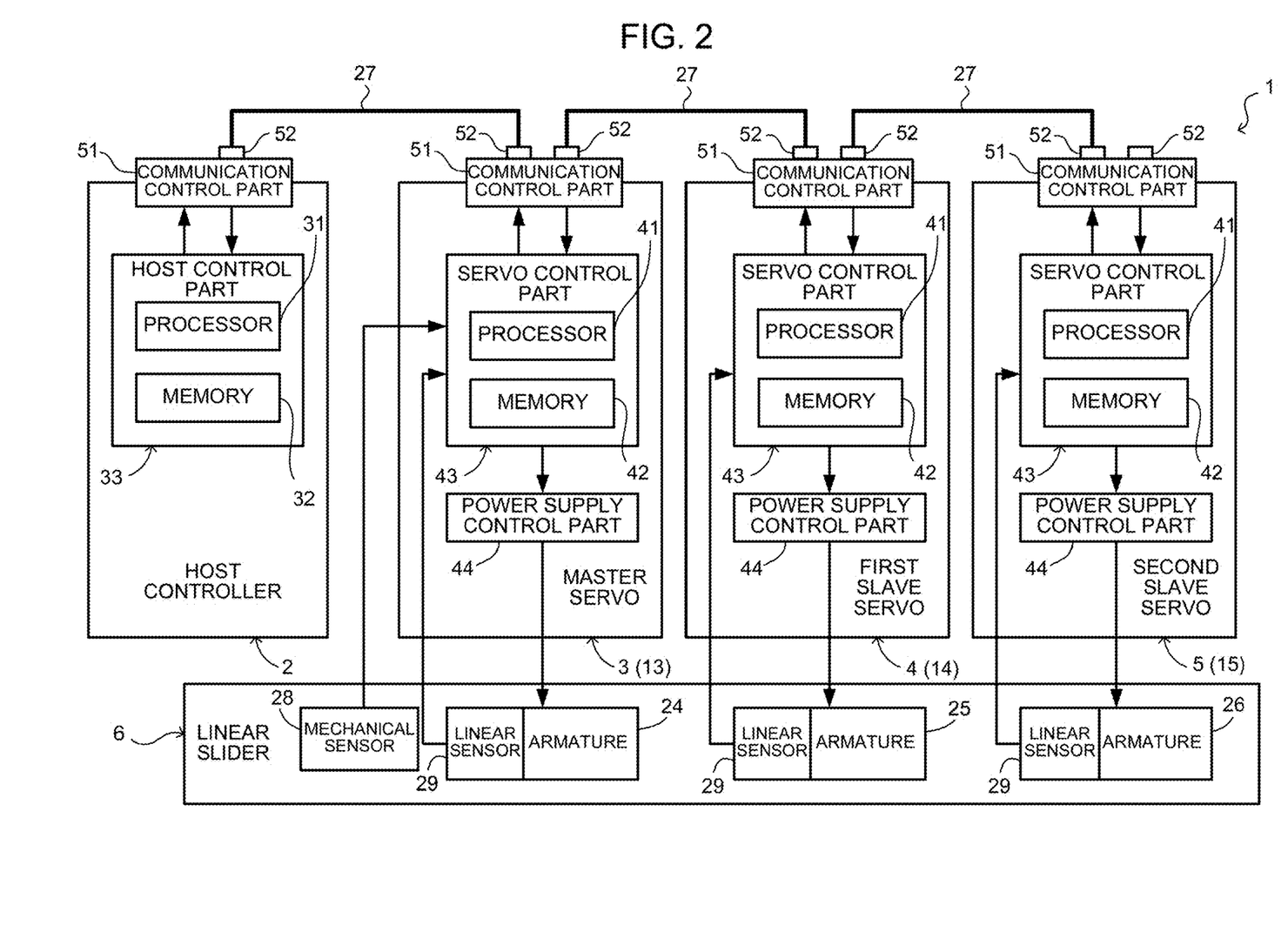
FIG. 2 is a diagram schematically showing an exemplary hardware block configuration of the multi-axis motor control system.

FIG. 2 schematically shows an exemplary hardware block configuration of the multi-axis motor control system 1. In FIG. 2, the host controller 2 has a host control part 33 which is configured as a computer including at least a processor 31 and a memory 32.

Also, each of the servo amplifiers 3, 4, and 5 includes a servo control part 43 that is configured as a computer including at least a processor 41 and a memory 42 (an embodiment of circuitry), and a power supply control part 44 that performs power supply control to the armatures 24, 25, and 26 of the linear motor based on a current instruction (described in detail below) output from the servo control part 43. Content of the power supply control in the servo control part 43 will be described below.

The linear slider 6 includes the three armatures 24, 25, and 26 respectively corresponding to the servo amplifiers 3, 4, and 5, and the mechanical sensor 28. Linear sensors 29 (not shown in FIG. 1) which are constituted by, for example, a linear scale and detect the relative movement positions and the like of the armatures 24, 25, and 26 are disposed in the armatures 24, 25, and 26, respectively. Each of the linear sensors 29 outputs detection information to the servo controller 43 in the corresponding one of the servo amplifiers 3, 4, and 5. The information detected by the linear sensor 29 will be described below.

Each of the host controller 2 and the servo amplifiers 3, 4, and 5 includes a communication control part 51 and a communication port 52. The communication control part 51 is a dedicated integrated circuit that is specifically designed to enable mutual communication. The communication port 52 is a communication interface for connection via the communication channel (cable 27). The host controller 2 includes one communication port 52, and each of the servo amplifiers 3, 4, and 5 includes two communication ports 52. These communication ports 52 are connected with each other via the communication channel (cable 27), thus forming the daisy chain connection.

Control Block of Motor Control and Control Related Information

Figure 3:
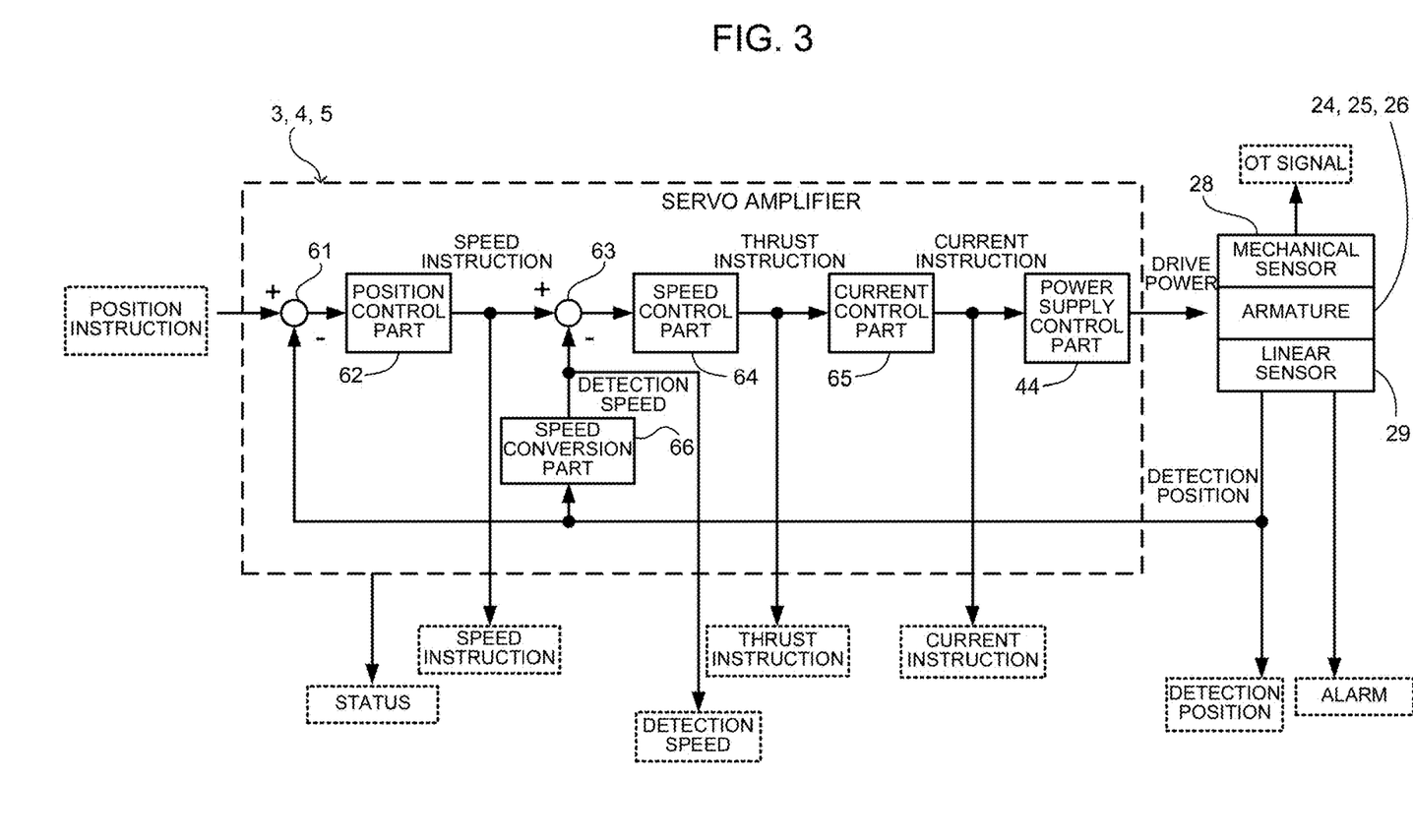
FIG. 3 is a diagram showing power supply control performed in each servo amplifier with control blocks in a transfer function form.

FIG. 3 shows motor control performed in each of the servo amplifiers 3, 4, and 5 with control blocks. In FIG. 3, the control blocks other than the power supply control part 44 are implemented by software executed by the processor 41 of the servo control part 43.

In FIG. 3, the servo amplifiers 3, 4, and 5 each include a subtracter 61, a position control part 62, a subtracter 63, a speed control part 64, a current control part 65, the power supply control part 44, and a speed conversion part 66. The subtracter 61 subtracts a detection position (described below) from the position instruction input from the host controller 2, and outputs a position deviation. The position control part 62 outputs a speed instruction based on the position deviation. The subtracter 63 subtracts detection speed (described below) from the speed instruction, and outputs a speed deviation. The speed control part 64 outputs a thrust instruction based on the speed deviation. The current control part 65 outputs a current instruction based on the thrust instruction, and the power supply control parts 44 control power to be supplied to the armatures 24, 25, and 26, respectively, based on the current instructions. Then, the linear sensors 29 detect the relative drive positions of the armatures 24, 25, and 26 to the stator 21, respectively, and output the relative drive positions to the servo amplifiers 3, 4, and 5 as detection positions, respectively. The detection position is subtracted from the position instruction by the subtracter 61, and input to the speed conversion part 66. The speed conversion parts 66 output detection speeds, which are driving speeds of the armatures 24, 25, and 26, respectively, based on the detection positions. The speed conversion part 66 may be constituted by a differentiator, for example, for performing temporal differentiation on the detection position.

The subtracter 61, the position control part 62, the subtracter 63, the speed control part 64, the current control part 65, the power supply control part 44, and the speed conversion part 66 as described above configure a dual feedback loop of a position control feedback loop and a speed control feedback loop, together with the external armatures 24, 25, and 26 and the external linear sensors 29. A current control feedback loop is also included inside the current control part 65, although omitted in the drawing.

Moreover, the servo amplifiers 3, 4, and 5 hold status information about the operation state of the servo amplifiers 3, 4, and 5 themselves, respectively. Further, the linear sensors 29 also detect alarm information about the abnormality of the linear sensors 29 themselves and output the alarm information to the corresponding servo amplifiers 3, 4, and 5, respectively. Also, as described above, the mechanical sensor 28 detects an OT signal indicating the operation abnormality of the linear motor, and outputs it to the master servo 13.

Further, in the present embodiment, the position instruction, the speed instruction, the thrust instruction, the current instruction, the detection position, the detection speed, the status information, the alarm information and the OT signal are communication information transmitted and received between the host controller 2 and each of the servo amplifiers 3, 4, and 5, and these are collectively referred to as "control related information". Among these, the speed instruction, the thrust instruction and the current instruction, which the control blocks of the servo amplifiers 3, 4, and 5 have generated by internal calculation based on the position instruction input from the host controller 2, are particularly referred to as "motor control instruction information". Moreover, the detection position, the detection speed, the status information and the alarm information about the state of the motor control, which are respectively detected, calculated, and held by the servo amplifiers 3, 4, and 5, are particularly referred to as "motor control status information". Moreover, for the state of the linear slider 6 which is a driving machine, the OT signal input only to the master servo 13 is referred to as "machine status information". All the control related information described above are finally received by the host controller 2 which recognizes and manages the control state of the entire system.

Summary of Information Processing

One type of network topology for transmitting and receiving information between the host controller 2 and the servo amplifiers 3, 4, and 5 is the daisy chain connection in which the respective control apparatuses are connected in series as described above. The daisy chain connection has advantages of improving noise immunity by reducing a total wiring length as compared with other network topology such as so-called star connection and efficiently managing their wiring and connections.

However, in the case of the daisy chain connection, due to the connection arrangement, there is a disadvantage that signal transmission to each control apparatus is likely to be delayed. For example, an instruction signal that is output from the host controller 2 at the distal end is transmitted in the order of daisy chain connection via the respective control apparatuses. Therefore, signals from the control apparatus farther from the host controller 2 pass through the greater number of the other control apparatuses on its way, and thus the time required for signal transmission process in which the signals pass through the control apparatuses is accumulated. As a result, the time required for the signals to finally reach the target control apparatus increases. Additionally, since the host controller 2 singly manages the entire control of the large number of daisy chain-connected apparatuses, the processing load is large. Therefore, the time interval in which the host controller 2 individually transmits signals to the respective control apparatuses is large.

Meanwhile, in order to focus on the noise immunity and the efficiency of wiring connection management as described above, it is desired that the motors respectively driven by the plurality of daisy chain-connected servo amplifiers 3, 4, and 5 are driven in coordination to perform assist control on the operation of the same target object (the mover table 22 in this embodiment). In order to solve this, it is contemplated that for the daisy chain connection, signal transmission is performed such that, for example, the single host controller 2 individually outputs instruction signals (for example, position instructions) to the plurality of servo amplifiers 3, 4, and 5 at the time intervals described above, respectively. In this case, since there is a large difference in the time required to individually receive the signal between the servo amplifiers 3, 4, and 5, there has been a possibility that the operations between the motors cannot be synchronized, and coordinated control may be difficult.

In the present embodiment, as will be described below, each of the plurality of servo amplifiers 3, 4, and 5 includes an information acquisition part that acquires control related information transmitted and received between the host controller 2 and the other servo amplifiers 3, 4, and 5, and a motor control part that controls a corresponding motor based on the control related information acquired by the information acquisition part. The function of the information acquisition part can remarkably reduce the time required to share the same control related information more than in the case that the respective servo amplifiers 3, 4, and 5 directly and individually receive the control related information from the same host controller 2 at the time interval, and coordinated control can be smoothly performed between the servo amplifiers 3, 4, and 5. Hereinbelow, a method for processing the control related information by the information acquisition part and the motor control part will be described in detail sequentially.

Figure 4:
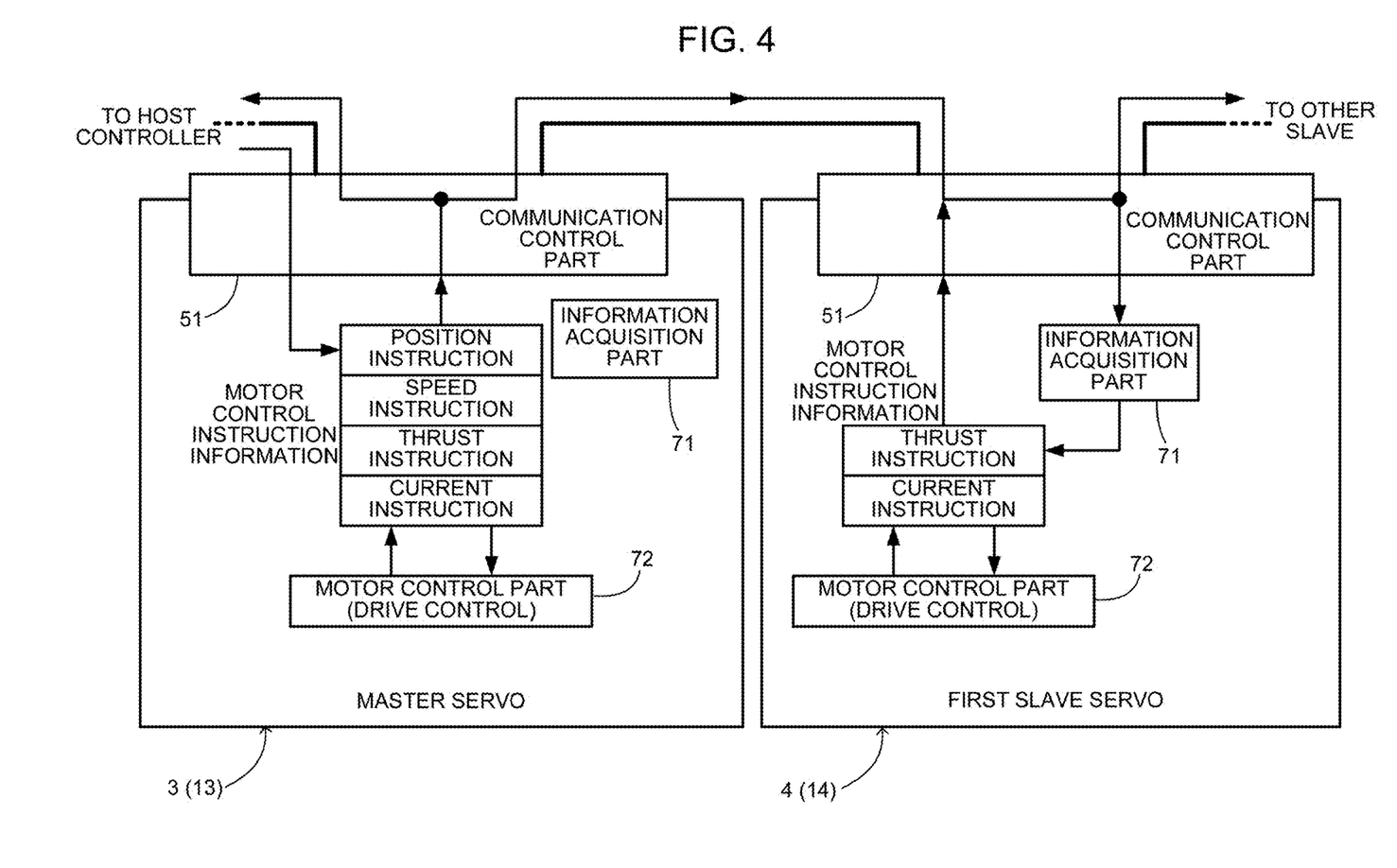
FIG. 4 is a diagram showing exemplary transmission paths and processing blocks of motor control instruction information in a master servo and a first slave servo.

First Method for Processing the Control Related Information: In the Case of Motor Control Instruction Information Firstly, a method for processing the motor control instruction information described above in the control related information will be described. FIG. 4 shows the transmission paths and the processing blocks of the motor control instruction information in the master servo 13 and the first slave servo 14 in the present embodiment. In FIG. 4, each of the servo amplifiers 3, 4, and 5 includes an information acquisition part 71 and a motor control part 72. The processing blocks of the information acquisition part 71 and the motor control part 72 are implemented by software executed by the processor 41 (arithmetic device) of the servo control part 43.

The information acquisition part 71 corresponds to an embodiment of means for referencing information transmitted and received between the host control apparatus and at least one other motor control apparatus, and extracting a part or all of the information described in claims. The motor control part 72 corresponds to an embodiment of means for controlling a corresponding motor based on the information.

In order to linearly drive the mover table 22 of the linear slider 6, the host controller 2 transmits a position instruction only to the master servo 13. In the case of processing the motor control instruction information, the motor control part 72 of each of the servo amplifiers 3, 4, and 5 functions as the control block of the motor control shown in FIG. 3. That is, the motor control part 72 of the master servo 13 performs internal calculation on a speed instruction, a thrust instruction, and a current instruction based on the position instruction received from the host controller 2 and controls power supply to the armature 24. In addition, the motor control part 72 returns, to the host controller 2, the motor control instruction information (speed instruction, thrust instruction, current instruction) that is obtained by performing the internal calculation. In the case of processing the motor control instruction information as described above, the information acquisition part 71 in the master servo 13 does not function.

Meanwhile, in the first slave servo 14, the information acquisition part 71 acquires only the thrust instruction from the motor control instruction information which the motor control part 72 of the master servo 13 returns to the host controller 2. In other words, the information acquisition part 71 of the first slave servo 14 references the motor control instruction information which the motor control part 72 of the master servo 13 transmits to the host controller 2, and extracts and acquires the thrust instruction from the motor control instruction information. Then, the motor control part 72 of the first slave servo 14 controls power supply to the armature 25 by performing internal calculation on the current instruction based on the thrust instruction acquired by the information acquisition part 71. Specifically, the motor control part 72, which functions as a control block of the motor control, performs the internal calculation on the current instruction by directly inputting the thrust instruction acquired by the information acquisition part 71 to the current control part 65.

Although not shown in FIG. 4, the second slave servo 15 also includes the infatuation acquisition part 71 and the motor control part 72 that function similarly to the first slave servo 14. As a result, in the second slave servo 15, the information acquisition part 71 acquires only the thrust instruction from the motor control instruction information which the motor control part 72 of the master servo 13 returns to the host controller 2, and the motor control part 72 controls power supply to the armature 26 by performing internal calculation on the current instruction based on the acquired thrust instruction.

As described above, by the processing method that rapidly transmits the motor control instruction information between the servo amplifiers 3, 4, and 5, the multi-axis motor control system 1 of the present embodiment can smoothly perform coordinated control between the servo amplifiers 3, 4, and 5.

In the case that the respective slave servos 14 and 15 perform follow-up control based on a position instruction common to the master servo 13, when even a small delay in transmission of the position instruction occurs, large interference occurs between motors (armatures 24, 25, and 26 in this embodiment) which perform position control on the same control object (mover table 22 in this embodiment), and smoothly coordinated control may be inhibited. Therefore, it is particularly preferable that the follow-up control of the respective slave servos 14 and 15 for the master servo 13 is performed based on the common thrust instruction, as in the present embodiment.

Figure 5:
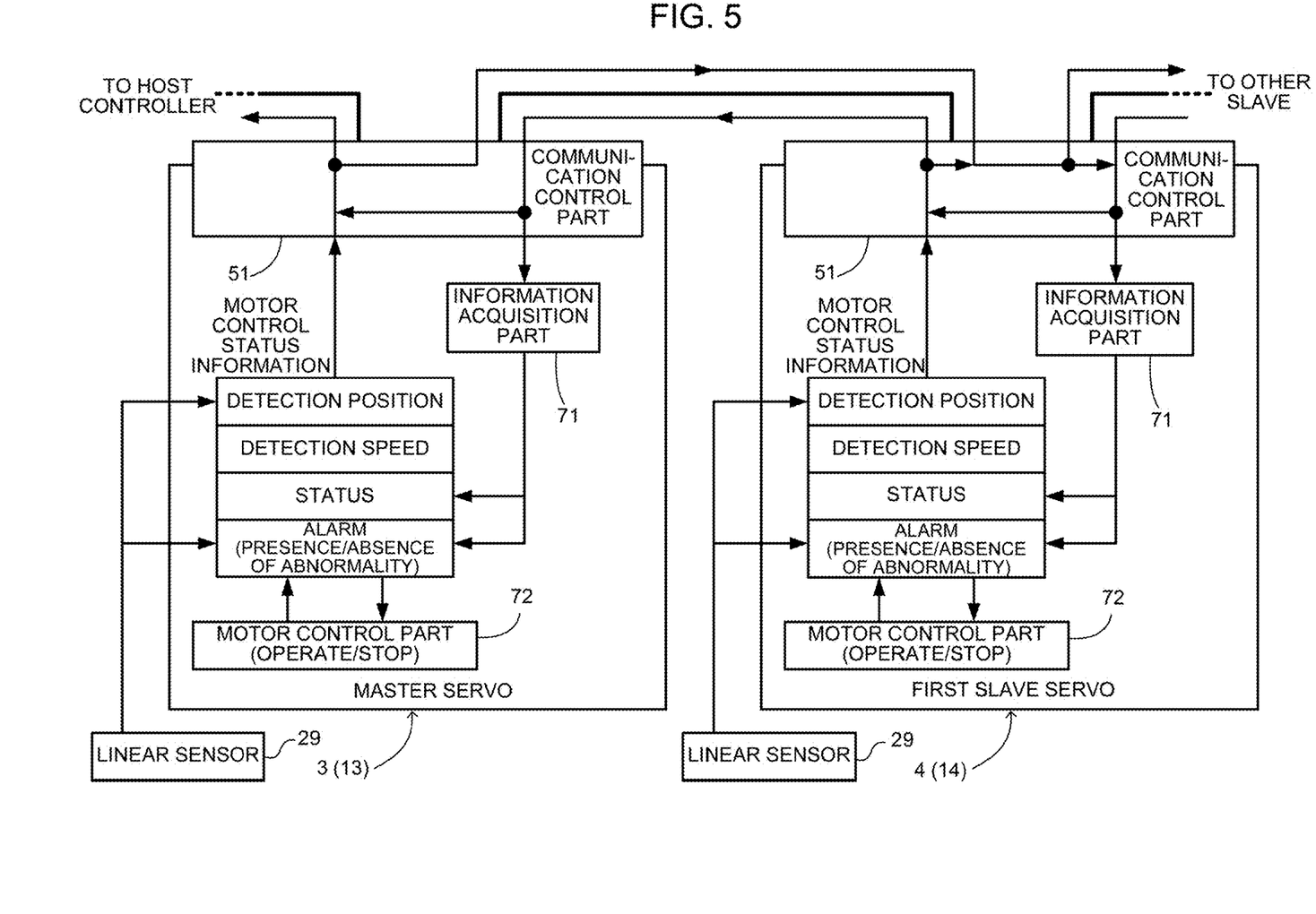
FIG. 5 is a diagram showing exemplary transmission paths and processing blocks of motor control status information in the master servo and the first slave servo.

Second Method for Processing the Control Related Information: In the Case of the Motor Control Status Information Next, a method for processing the motor control status information described above in the control related information will be described. FIG. 5 shows the transmission paths and the software processing blocks of the motor control status information in the master servo 13 and the first slave servo 14 in the present embodiment. The second slave servo 15 (not shown) also performs processing as with the first slave servo 14.

The motor control status information includes: detection position and alarm information detected by the corresponding linear sensor 29 in each of the servo amplifiers 3, 4, and 5; detection speed calculated by each of the servo amplifiers 3, 4, and 5; and status information held by each of the servo amplifiers 3, 4, and 5. In the case of processing the motor control status information, the motor control part 72 of each of the servo amplifiers 3, 4, and 5 outputs the detection position to the control block of the motor control shown in FIG. 3, and transmits the motor control status information to the host controller 2. Moreover, in the case of detecting a presence of the abnormality based on the alarm information, the motor control parts 72 stop operations of the motors by, for example, blocking the power supply to the armatures 24, 25, and 26, respectively.

Moreover, the information acquisition part 71 of each one of the servo amplifiers 3, 4, and 5 acquires only the status information and the alarm information from the motor control status information which the motor control parts 72 of the other servo amplifiers 3, 4, and 5 transmit to the host controller 2. In other words, the information acquisition part 71 references the motor control status information which the motor control parts 72 of the other servo amplifiers 3, 4, and 5 transmit to the host controller 2, and acquires and extracts the status information and alarm information from the motor control status information. At this time, there is a case that, in the arrangement of daisy chain connection, one of the servo amplifiers 3, 4, and 5 may be connected between the other one of the servo amplifiers 3, 4, and 5 which is a transmission source of the motor control status information, and the host controller 2 which is a transmission destination thereof. Particular, in this case, the information acquisition part 71 of the servo amplifier disposed between the transmission source and the transmission destination monitors while relaying the motor control status information transmitted and received between the transmission source and the transmission destination, and extracts and acquires necessary status information and alarm information. Then, also in the case of detecting a presence of the abnormality in the alarm information acquired by the information acquisition part 71, the motor control part 72 of each of the servo amplifiers 3, 4, and 5 stops the operation of the motor. That is, the three servo amplifiers 3, 4, and 5 mutually monitor the abnormality of the alarm information detected by each of them, and in the case of detecting even one abnormality, all the servo amplifiers 3, 4, and 5 stop the operations of the motors. In this case, there is no difference in function between the master servo 13 and the slave servos 14 and 15.

As described above, by the processing method for mutually monitoring the motor control status information between the servo amplifiers 3, 4, and 5, the multi-axis motor control system 1 of the present embodiment can stop the operation of each motor in coordination between the servo amplifiers 3, 4, and 5.

Figure 6:
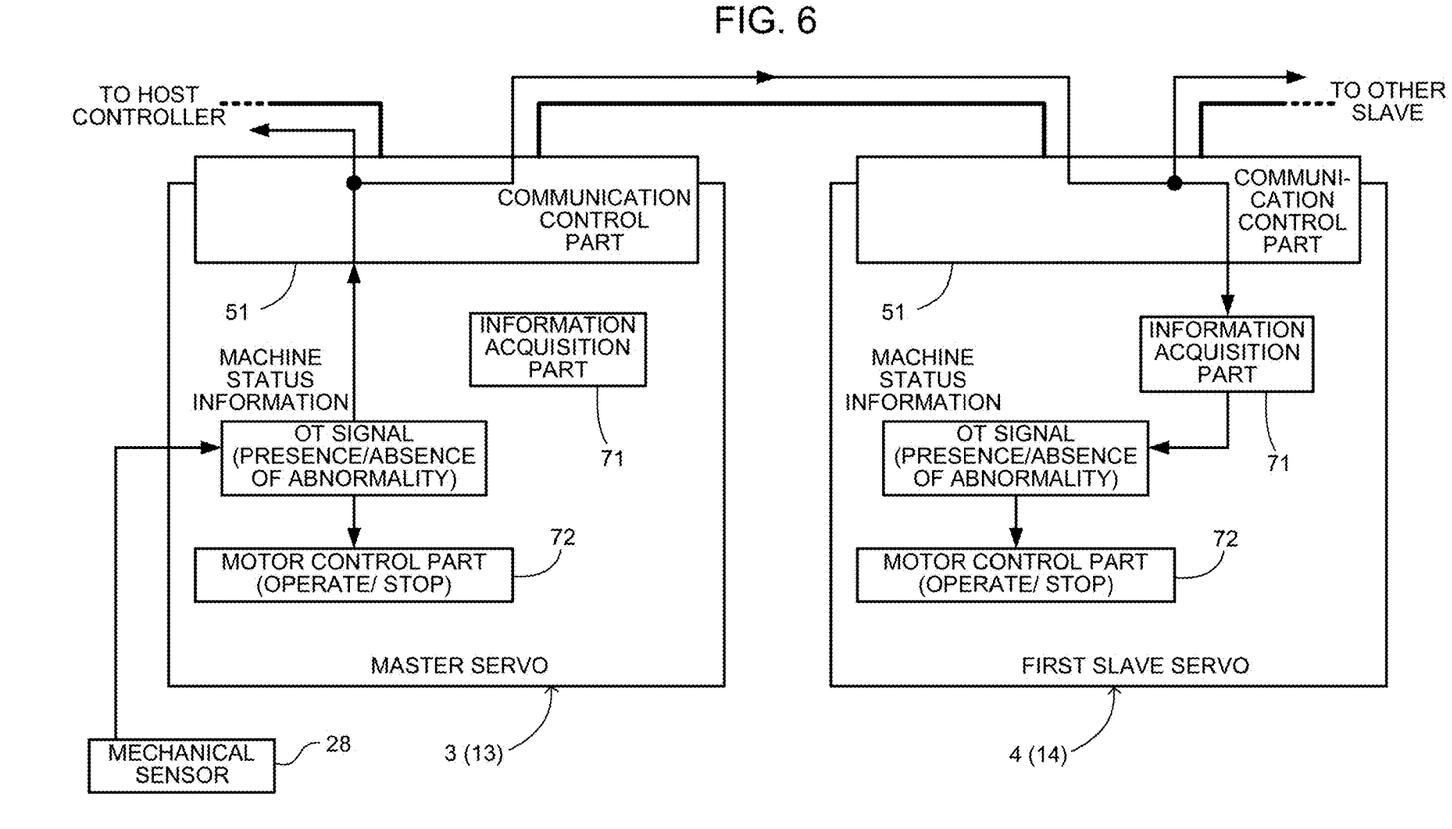
FIG. 6 is a diagram showing exemplary transmission paths and processing blocks of machine status information in the master servo and the first slave servo.

Third Method for Processing the Control Related Information: In the Case of Machine Status Information Next, a method for processing the machine status information described above in the control related information will be described. FIG. 6 shows the transmission paths and the software processing blocks of the machine status information in the master servo 13 and the first slave servo 14 in the present embodiment. The second slave servo 15 (not shown) also performs processing as in the first slave servo 14.

The mechanical sensor 28 detects an OT signal. In the case of processing the machine status information, in the case of detecting a presence of the abnormality based on the OT signal, the motor control parts 72 of the servo amplifiers 3, 4, and 5 stop the operations of the motors by blocking the power supply to the armatures 24, 25, and 26, respectively. Then, the motor control part 72 transmits machine status information to the host controller 2. In the case of processing the machine status information as described above, the information acquisition part 71 in the master servo 13 does not function.

Meanwhile, the information acquisition part 71 of the first slave servo 14 references the machine status information which the motor control part 72 of the master servo 13 transmits to the host controller 2, and acquires the machine status information. Then, in the case of detecting a presence of the abnormality based on the machine status information acquired by the information acquisition part 71, the motor control part 72 of the first slave servo 14 stops the operation of the motor. The information acquisition part 71 of the second slave servo 15 (not shown) references the machine status information which the motor control part 72 of the master servo 13 transmits to the host controller 2, and further acquires the machine status information. In the case of detecting a presence of the abnormality based on the machine status information, the motor control part 72 of the second slave servo 15 stops the operation of the motor. That is, following the motor stop of the master servo 13 based on the machine status information, the other two slave servos 14 and 15 also stop the operations of the motors.

As described above, by the processing method for acquiring the machine status information between the servo amplifiers 3, 4, and 5, the multi-axis motor control system 1 of the present embodiment can stop the operation of each motor in coordination between the servo amplifiers 3, 4, and 5.

Effect of the Present Embodiment

As described above, according to the multi-axis motor control system 1 of the present embodiment, each of the plurality of servo amplifiers 3, 4, and 5 includes the information acquisition part 71 that acquires the control related information transmitted and received between the host controller 2 and the other servo amplifiers 3, 4, and 5, and the motor control part 72 that controls the corresponding motor based on the control related information acquired by the information acquisition part 71. Such a function of the information acquisition part 71 can remarkably reduce the time required to share the same control related information more than in the case that each of the servo amplifiers 3, 4, and 5 directly and individually receives the control related information from the same host controller 2. As a result, controllability between the plurality of daisy chain-connected servo amplifiers 3, 4, and 5 can be improved.

Moreover, particularly in the present embodiment, one of the pluralities of servo amplifiers 3, 4, and 5 is set as the master servo 13, and the others are set as the slave servos 14 and 15. As a result, it is possible to perform functional coordinated control between the plurality of servo amplifiers 3, 4, and 5 such that control of the other slave servos 14 and 15 can be specified so as to follow the control of the one master servo 13 which is set as a reference.

Moreover, particularly in the present embodiment, the control related information includes the motor control instruction information which is a motor control instruction (speed instruction, thrust instruction, current instruction in this embodiment) that the master servo 13 has generated by internal calculation. As a result, coordinated drive control can be performed in the plurality of servo amplifiers 3, 4, and 5 (a plurality of motors) on the operation of the same target object like the mover table 22 in this embodiment.

Moreover, particularly in the present embodiment, the motor control instruction information includes the thrust instruction. As a result, thrust assist control can be performed which the plurality of servo amplifiers 3, 4, and 5 (a plurality of motors) performs in coordination on the operation of the same target object.

Moreover, particularly in the present embodiment, in each of the slave servos 14 and 15, the information acquisition part 71 acquires the thrust instruction that is transmitted and received between the host controller 2 and the master servo 13, and the motor control part 72 controls the corresponding motor based on the thrust instruction acquired by the information acquisition part 71.

The thrust instruction is the control related information which the master servo 13 generates and outputs in unipolar manner based on the position instruction received from the host controller 2. That is, the thrust instruction which the one master servo 13 has transmitted to the host controller 2 is set as a reference, and the control of the other slave servos 14 and 15 is specified so as to follow the thrust instruction. By functionalizing the information acquisition parts 71 of the slave servos 14 and 15, each of the servo amplifiers 3, 4, and 5 can remarkably reduce the time required to share the same thrust instruction more than in the case of directly and individually receiving the thrust instruction from the same host controller 2.

Further, in the case that thrust control is performed based on the same thrust instruction between the plurality of servo amplifiers 3, 4, and 5, even if there is some deviation in the timing of starting each control, there is no great influence on the thrust assist operation which all the plurality of servo amplifiers 3, 4, and 5 perform in coordination. That is, when the plurality of daisy chain-connected servo amplifiers 3, 4, and 5 (the plurality of motors) performs coordinated control on the operation of the same target object, it is a particularly suitable combination that the master servo 13 generates and outputs the thrust instruction as the control related information and the information acquisition part 71 of each of the slave servos 14 and 15 acquires the thrust instruction.

Although the motor driven and controlled by each of the servo amplifiers 3, 4, and 5 is a linear motion type linear motor in the present embodiment, a rotary motor may be also applied. In this case, the master servo 13 performs internal calculation on a torque instruction, instead of the thrust instruction, and the information acquisition parts 71 of the other slave servos 14 and 15 acquire the torque instruction. Although not specifically shown, such a multi-axis motor control system 1 is suitable for torque assist control for a driving machine in which the output shafts of the respective rotary motors are mechanically connected with each other, for example. An embodiment of such a driving machine will be described in detail below.

Moreover, particularly in the present embodiment, the control related information includes motor control status information about the state of motor control (detection position, detection speed, status information, and alarm information in this embodiment). As a result, it is possible to perform coordinated control in the plurality of servo amplifiers 3, 4, and 5 (a plurality of motors) depending on the state of each motor control.

Moreover, particularly in the present embodiment, in each of the plurality of servo amplifiers 3, 4, and 5, the information acquisition part 71 acquires the motor control status information transmitted and received between the host controller 2 and the other servo amplifiers 3, 4, and 5, and the motor control part 72 controls the corresponding motor based on the motor control status information acquired by the information acquisition part 71.

The motor control status information is control related information which is output in multipolar manner from the plurality of servo amplifiers 3, 4, and 5 without distinction between the master and the slave. That is, the motor control status information output by any one of the servo amplifiers 3, 4, and 5 is set as a reference, and the control of the others of the servo amplifiers 3, 4, and 5 is specified. By functionalizing the information acquisition part 71 of each of the servo amplifiers 3, 4, and 5 as described above, each of the servo amplifiers 3, 4, and 5 can remarkably reduce the time required to share the same motor control status information more than in the case of directly and individually receiving the motor control status information from the same host controller 2.

Moreover, particularly in the present embodiment, the control related information includes the machine status information (OT signal in this embodiment) about a state of the linear slider 6 driven by the motor. As a result, it is possible to perform coordinated control in the plurality of servo amplifiers 3, 4, and 5 (a plurality of motors) depending on the state of the linear slider 6.

Moreover, particularly in the present embodiment, in each of the plurality of servo amplifiers 3, 4, and 5, the information acquisition part 71 acquires the machine status information transmitted and received between the host controller 2 and at least one of the servo amplifiers 3, 4, and 5, and the motor control part 72 controls the corresponding motor based on the machine status information acquired by the information acquisition part 71.

The machine status information is the control related information that is output in unipolar manner from the linear slider 6. That is, the machine status information detected by at least one of the servo amplifiers 3, 4, and 5 is set as a reference, and the control of the others of the servo amplifiers 3, 4, and 5 is specified so as to follow the machine status information. By functionalizing the information acquisition parts 71 of the others of the servo amplifiers 3, 4, and 5 as described above, each of the servo amplifiers 3, 4, and 5 can remarkably reduce the time required to share the same machine status information more than in the case of directly and individually receiving the machine status information from the same host controller 2.

In the present embodiment, the mechanical sensor 28 of the linear slider 6 outputs the OT signal (machine status information) only to the master servo 13, but may output only it to any one of the other slave servos 14 and 15. In this case, the information acquisition part 71 of the master servo 13 may acquire the machine status information from the other slave servos 14 and 15, and the information acquisition part 71 of the slave servo to which the OT signal is input does not function.

Moreover, in the present embodiment, among the plurality of servo amplifiers 3, 4, and 5 daisy chain-connected to the host controller 2, the closest amplifier to the host controller 2 is set as the master servo 13, but not limited thereto. For example, although not specifically shown, any one of the second closest amplifier to or the farthest amplifier from the host controller 2 may be set as the master servo 13, and the others may be disposed as the slave servos 14 and 15. In this case, in the arrangement of daisy chain connection, at least one of the slave servos 14 and 15 is connected between the master servo 13 which is a transmission source of the motor control instruction information or the machine status information and the host controller 2 which is a transmission destination of the motor control instruction information or the machine status information. Particularly in this case, the information acquisition part 71 of the slave servo disposed between the master servo 13 and the host controller 2 monitors while relaying the motor control instruction information or the machine status information transmitted and received between the transmission source and the transmission destination, and extracts and acquires necessary information (thrust information, torque information, OT signal or the like in this embodiment).

Modification

For the embodiments as described above, various modifications can be made without departing from the spirit and technical idea.

For example, in the embodiments, the example of the linear slider 6 was described in which the plurality of armatures 24, 25, and 26 controlled in coordination by the plurality of servo amplifiers 3, 4, and 5 linearly drives the single mover table 22, but not limited thereto. In addition, for example, as shown in FIG. 7, a coordinated control method similar to the embodiments may be applied to a multi-axis press control system 100 in which a plurality of rotary motors 124 and 125 controlled in coordination by a plurality of servo amplifiers 103 and 104 linearly drives a common press shaft 123 to thereby output pressure.

Figure 7:
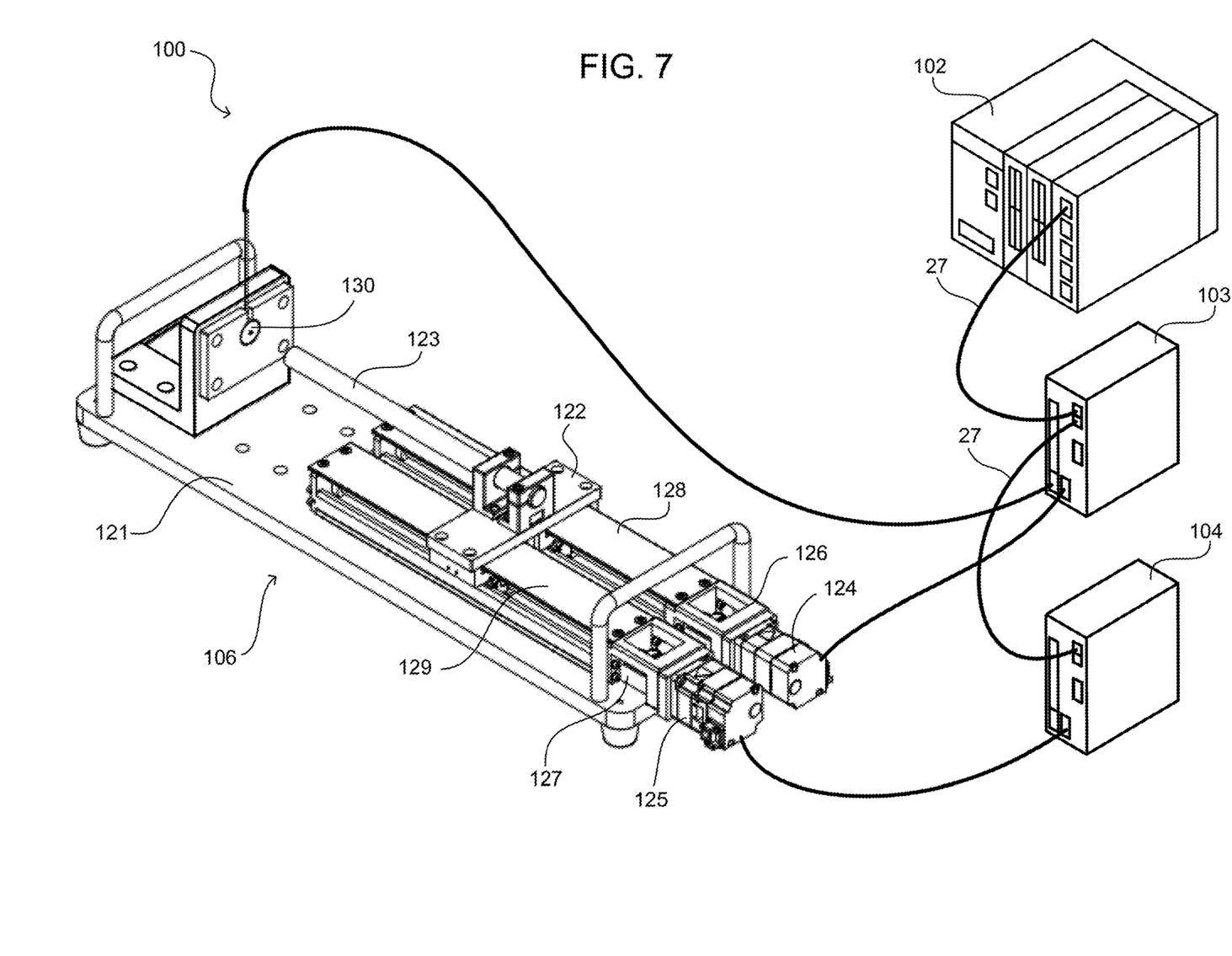
FIG. 7 is a diagram showing an exemplary schematic system configuration of a multi-axis press control system.

In FIG. 7, the multi-axis press control system 100 includes one host controller 102, two servo amplifiers 103 and 104 connected to the host controller 102 so as to enable signal transmission and reception, and one multi-axis press machine 106 whose driving is controlled by these two servo amplifiers 103 and 104. Since the host controller 102, the respective servo amplifiers 103 and 104 and the like are configured as in the embodiment, the same reference numerals are given and the detailed description thereof will be omitted.

The multi-axis press machine 106 (an embodiment of a pressure machine) shown in FIG. 7 linearly drives the single press shaft 123 in an axial direction, and controls the pressure generated at the portion pressed by the end of the single press shaft 123 to a desired pressure. In the example shown in FIG. 7, the multi-axis press machine 106 includes a single base 121, two rotary motors 124 and 125 disposed side by side on the base 121, two couplings 126 and 127 and two ball screw drivers 128 and 129 each connected to these two rotary motors 124 and 125, a single movable table 122 commonly connected to each of the ball screw drivers 128 and 129, the press shaft 123 fixed on the movable table 122, and one pressure sensor 130 (an embodiment of a pressure detector) fixedly disposed in extension of the linear advancement direction of the press shaft 123.

The two rotary motors 124 and 125 are rotatably driven in coordination, and thus the single movable table 122 and the press shaft 123 move linearly in the axial direction corresponding to the rotation direction. In the case that the end of the press shaft 123 presses the pressure sensor 130, the pressure sensor 130 outputs the detection pressure only to the master servo 103.

The pressing pressure of the single press shaft 123 in the case that coordinated operation is performed by the driving forces of the plurality of motors which is disposed in parallel is greater than that in the case that the driving force of the single motor of any one of the plurality of motors presses the pressure sensor. That is, even with a small torque motor, the plurality of motors is disposed in parallel to perform coordinated operation, thereby increasing the pressure to be output.

Further, in order to obtain desired pressure, it is necessary to perform feedback control. However, if a plurality of pressure sensors is disposed corresponding to each of the servo amplifiers (not specifically shown), pressure irregularity is likely to occur depending on the installation positions of the respective pressure sensors, and thus there is a possibility that stable coordinated control may be difficult. Moreover, in the case that each servo amplifier individually performs feedback control to the detection pressure from a single pressure sensor (not specifically shown), inter-shaft interference occurs due to a small transmission delay or the like and causes vibration. As a result, coordinated control may be still difficult.

Figure 8:
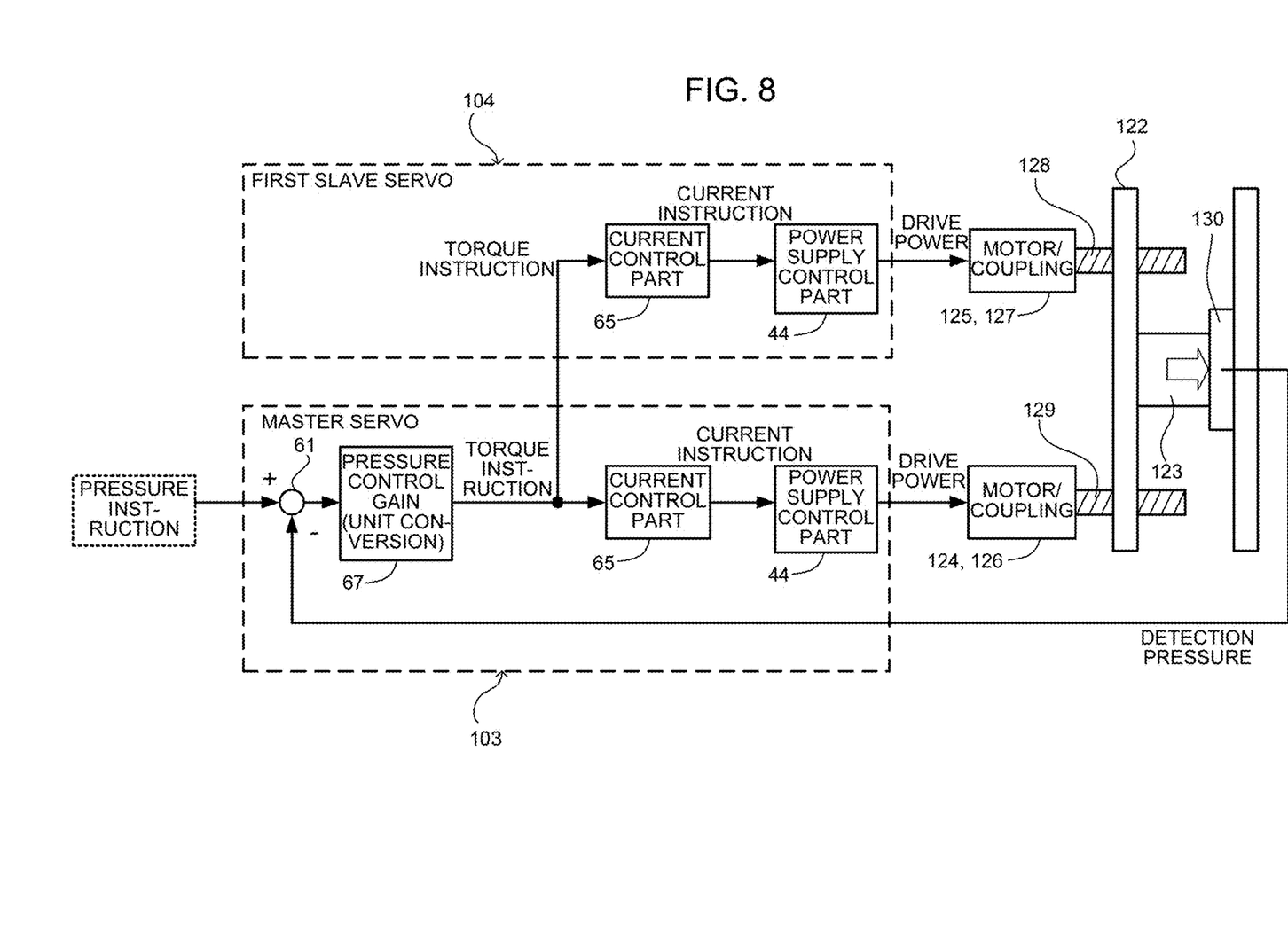
FIG. 8 is a diagram showing power supply control performed in each servo amplifier with control blocks in a transfer function form.
Figure 9:
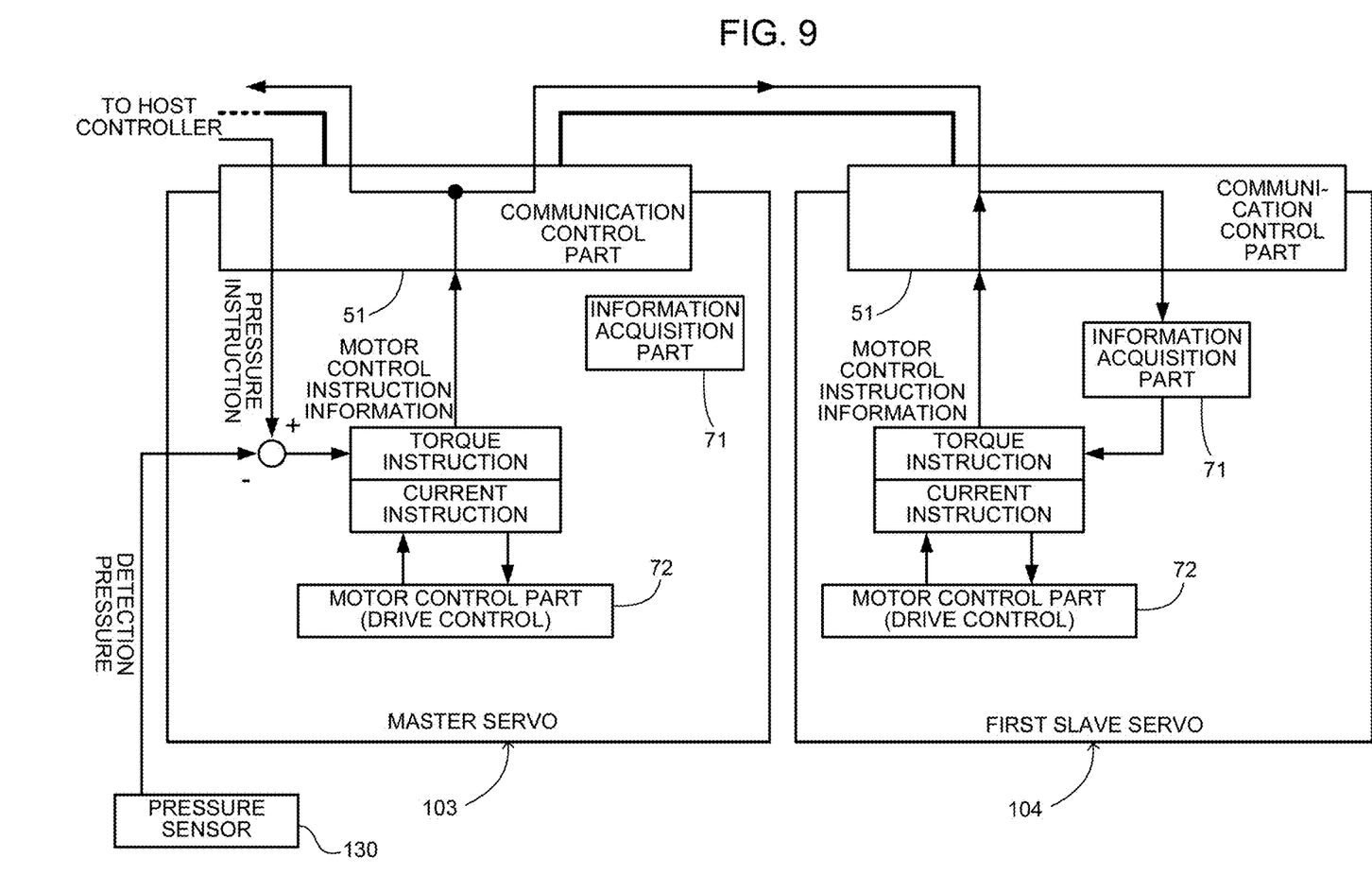
FIG. 9 is a diagram showing transmission paths and processing blocks of the motor control instruction information in the master servo and the first slave servo.

In the present modification, as shown in the control block diagram of FIG. 8 and the processing blocks of FIG. 9, the pressure instruction from the host controller 102 and the detection pressure from the pressure sensor 130 are input only to the master servo 103. The master servo 103 calculates a torque instruction by multiplying the deviation between the pressure instruction and the detection pressure by a pressure control gain 67 (not shown in FIG. 9) (in this case, the pressure and torque units are also converted), and inputs the torque instruction to the current control part 65 to control the driving of the corresponding rotary motor 124. Then, in the first slave servo 104, the information acquisition part 71 references and acquires the torque instruction calculated by the master servo 103, and inputs it directly to the current control part 65 to perform follow-up control. That is, the first slave servo 104 performs assist control on the master servo 103 by the common torque instruction. As a result, smoothly coordinated control can be performed using the plurality of servo amplifiers 103 and 104 and the rotary motors 124 and 125, and pressure full-closed feedback control of the multi-axis press machine 106 can be performed stably.

The processing and the like in the position control part 62, the speed control part 64, the current control part 65, the speed conversion part 66, the information acquisition part 71, the motor control part 72 and the like described above are not limited to the embodiment of sharing of the processing. For example, the processing may be processed by a smaller number of processing parts (for example, one processing part), or may be processed by more segmentalized processing parts. Moreover, in the servo amplifiers 3, 4, and 5, only the power supply control part 44 may be implemented by an actual device, and other functions may be implemented by the program executed by the foregoing processor 41. Moreover, a part or all of the position control part 62, the speed control part 64, the current control part 65, the speed conversion part 66, the information acquisition part 71, the motor control part 72 and the like may be implemented by actual devices, such as ASIC, FPGA, or other electric circuits.

Techniques by the embodiment and each modified example may be appropriately combined and utilized in addition to the examples having already described above. Although exemplification is not performed one by one, the embodiment and each modified example are carried out by various changes being applied thereto without departing from the technical idea of the present disclosure.

What is claimed is:
1. A multi-axis motor control system, comprising:
a host control apparatus;
a plurality of motors comprising a first motor and a second motor;
a plurality of motor control apparatuses comprising a first motor control apparatus configured to control the first motor and a second motor control apparatus configured to control the second motor such that the first motor and the second motor coordinately drive a same target object; and
a communication channel configured to connect the host control apparatus, the first motor control apparatus and the second motor control apparatus in series such that the first motor control apparatus is connected to a host control apparatus side of the second motor control apparatus,
wherein the first motor control apparatus comprises first circuitry configured to control the first motor based on control signals received from the host control apparatus, and the second motor control apparatus comprises second circuitry configured to acquire control related information transmitted and received between the host control apparatus and the first motor control apparatus and control the second motor based on the control related information,
wherein the multi-axis motor control system further comprises:
a press machine that outputs pressure by driving of the first motor and the second motor, and
a pressure detection sensor that detects the pressure output by the press machine, and
wherein the host control apparatus transmits a pressure instruction to the first motor control apparatus, the first circuitry of the first motor control apparatus controls the first motor based on a torque instruction or a thrust instruction calculated from a deviation between the pressure instruction and the pressure detected by the pressure detection sensor, and the second circuitry of the second motor control apparatus controls the second motor based on the torque instruction or the thrust instruction.

2. The multi-axis motor control system according to claim 1, wherein the control related information includes motor control instruction information which is a motor control instruction generated by internal calculation of the first circuitry.

3. The multi-axis motor control system according to claim 2, wherein the motor control instruction information includes a torque instruction or a thrust instruction.

4. The multi-axis motor control system according to claim 3, wherein the second motor control apparatus comprises the second circuitry configured to acquire a torque instruction or a thrust instruction transmitted and received between the host control apparatus and the first motor control apparatus, and control the second motor based on the torque instruction or the thrust instruction.

5. The multi-axis motor control system according to claim 4, wherein the control related information includes motor control status information with respect to a state of a motor control.

6. The multi-axis motor control system according to claim 5, wherein the second motor control apparatus comprises the second circuitry configured to acquire the motor control status information transmitted and received between the host control apparatus and the first motor control apparatus, and control the second motor based on the motor control status information, and the first motor control apparatus comprises the first circuitry configured to acquire the motor control status information transmitted and received between the host control apparatus the second motor control apparatus, and control the first motor based on the motor control status information.

7. The multi-axis motor control system according to claim 6, wherein the control related information includes machine status information with respect to a state of a driving machine driven by the first motor and the second motor.

8. The multi-axis motor control system according to claim 7, wherein the second motor control apparatus comprises the second circuitry configured to acquire the machine status information transmitted and received between the host control apparatus and the first motor control apparatus, and control the second motor based on the machine status information.

9. The multi-axis motor control system according to claim 1, wherein the second motor control apparatus comprises the second circuitry configured to acquire a torque instruction or a thrust instruction transmitted and received between the host control apparatus and the first motor control apparatus, and control the second motor based on the torque instruction or the thrust instruction.

10. The multi-axis motor control system according to claim 9, wherein the control related information includes motor control status information with respect to a state of a motor control.

11. The multi-axis motor control system according to claim 1, wherein the control related information includes motor control status information with respect to a state of a motor control.

12. The multi-axis motor control system according to claim 11, wherein the second motor control apparatus comprises the second circuitry configured to acquire the motor control status information transmitted and received between the host control apparatus and the first motor control apparatus, and control the second motor based on the motor control status information, and the first motor control apparatus comprises the first circuitry configured to acquire the motor control status information transmitted and received between the host control apparatus the second motor control apparatus, and control the first motor based on the motor control status information.

13. The multi-axis motor control system according to claim 1, wherein the control related information includes machine status information with respect to a state of a driving machine driven by the first motor and the second motor.

14. The multi-axis motor control system according to claim 13, wherein the second motor control apparatus comprises the second circuitry configured to acquire the machine status information transmitted and received between the host control apparatus and the first motor control apparatus, and control the second motor based on the machine status information.

15. A motor control apparatus, comprising:
circuitry configured to acquire control related information transmitted and received between a host control apparatus and another motor control apparatus and control a motor based on the control related information, when the motor control apparatus controls the motor such that the motor and another motor controlled by the another motor control apparatus coordinately drive a same target object,
wherein the motor control apparatus is connected to the host control apparatus and the another motor control apparatus in series via a communication channel such that the another motor control apparatus is connected to a host control apparatus side of the motor control apparatus,
wherein the circuitry is further configured to control the motor based on control signals received from the host control apparatus,
wherein the another motor control apparatus includes second circuitry configured to acquire control related information transmitted and received between the host control apparatus and the motor control apparatus and to control the another motor based on the control related information, and
wherein the circuitry is further configured to transmit, from the host control apparatus, a pressure instruction to the motor control apparatus and control the motor based on a torque instruction or a thrust instruction calculated from a deviation between the pressure instruction and pressure detected by a pressure detection sensor that detects the pressure output by a press machine that outputs pressure by driving of the motor and the another motor, and the second circuitry of the another motor control apparatus is further configured to control the another motor based on the torque instruction or the thrust instruction.

16. The motor control apparatus according to claim 15, wherein the control related information includes at least one of motor control instruction information which is a motor control instruction generated by internal calculation of the another motor control apparatus, motor control status information with respect to a state of a motor control, and machine status information with respect to a state of a driving machine driven by the motor and another motor.

17. A motor control method, comprising:
acquiring control related information transmitted and received between a host control apparatus and at least another motor control apparatus; and
controlling a motor based on the control related information,
wherein the motor and another motor controlled by the another motor control apparatus coordinately drive a same target object, and the motor control method is executed by an arithmetic processing circuit of a motor control apparatus connected to the host control apparatus and the another motor control apparatus in series via a communication channel such that the another motor control apparatus is connected to a host control apparatus side of the motor control apparatus,
wherein the controlling further comprises controlling, using first circuitry of the motor control apparatus, the motor based on control signals received from the host control apparatus, acquiring, using second circuitry of the another motor control apparatus, control related information transmitted and received between the host control apparatus and the motor control apparatus and controlling, using the second circuitry of the another motor control apparatus, the another motor based on the control related information, and
wherein the controlling further comprises transmitting, from the host control apparatus, a pressure instruction to the motor control apparatus, the first circuitry of the motor control apparatus controlling the motor based on a torque instruction or a thrust instruction calculated from a deviation between the pressure instruction and pressure detected by a pressure detection sensor that detects the pressure output by a press machine that outputs pressure by driving of the motor and the another motor, and the second circuitry of the another motor control apparatus controls the another motor based on the torque instruction or the thrust instruction.

18. A multi-axis motor control system, comprising:
a host control apparatus;
a plurality of motors comprising a first motor and a second motor;
a plurality of motor control apparatuses comprising a first motor control apparatus configured to control the first motor and a second motor control apparatus configured to control the second motor such that the first motor and the second motor coordinately drive a same target object; and
a communication channel configured to connect the host control apparatus, the first motor control apparatus and the second motor control apparatus in series such that the first motor control apparatus is connected to a host control apparatus side of the second motor control apparatus,
wherein the first motor control apparatus comprises first controlling means for controlling the first motor based on control signals received from the host control apparatus, and the second motor control apparatus comprises referencing means for referencing information transmitted and received between the host control apparatus and the second controlling means for controlling the second motor based on the information, wherein the multi-axis motor control system further comprises:
- a press machine that outputs pressure by driving of the first motor and the second motor, and
- a pressure detection sensor that detects the pressure output by the press machine, and wherein the host control apparatus transmits a pressure instruction to the first motor control apparatus, the first controlling means of the first motor control apparatus controls the first motor based on a torque instruction or a thrust instruction calculated from a deviation between the pressure instruction and the pressure detected by the pressure detection sensor, and the second controlling means of the second motor control apparatus controls the second motor based on the torque instruction or the thrust instruction.

* * * * *